(12) United States Patent
Tamura et al.

(10) Patent No.: US 9,411,095 B2
(45) Date of Patent: Aug. 9, 2016

(54) OPTICAL-FIBER PREFORM AND METHOD FOR MANUFACTURING OPTICAL-FIBER PREFORM

(71) Applicant: SUMITOMO ELECTRIC INDUSTRIES, LTD., Osaka-shi, Osaka (JP)

(72) Inventors: Yoshiaki Tamura, Yokohama (JP); Tetsuya Haruna, Yokohama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/765,110

(22) PCT Filed: Jan. 28, 2014

(86) PCT No.: PCT/JP2014/051814
§ 371 (c)(1),
(2) Date: Jul. 31, 2015

(87) PCT Pub. No.: WO2014/119559
PCT Pub. Date: Aug. 7, 2014

(65) Prior Publication Data
US 2015/0370008 A1    Dec. 24, 2015

(30) Foreign Application Priority Data
Feb. 4, 2013  (JP) ................................ 2013-019453

(51) Int. Cl.
*G02B 6/02*   (2006.01)
*C03B 37/018*  (2006.01)
*C03B 37/012*  (2006.01)
*C03C 13/04*   (2006.01)

(52) U.S. Cl.
CPC ........ *G02B 6/0229* (2013.01); *C03B 37/01248* (2013.01); *C03B 37/01807* (2013.01);
(Continued)

(58) Field of Classification Search
CPC ........... G02B 6/0229; C03B 37/01248; C03B 2201/20; C03B 2201/50
USPC .......................................................... 385/123
See application file for complete search history.

(56) References Cited

U.S. PATENT DOCUMENTS 5,146,534 A     9/1992  Lines
7,088,900 B1 *  8/2006  Mishra .................. C03C 3/06
                                                       385/123
(Continued)

FOREIGN PATENT DOCUMENTS

JP   2005-537210 A   12/2005
JP   2007-504080 A    3/2007
(Continued)

OTHER PUBLICATIONS

Koichi Kajihara et al., "Surface Dissolution and Diffusion of Oxygen Molecules in $SiO_2$ Glass," Journal of the Ceramic Society of Japan, 2004, pp. 559-562, vol. 112, No. 10.

*Primary Examiner* — Sung Pak
(74) *Attorney, Agent, or Firm* — Drinker Biddle & Reath LLP

(57) ABSTRACT

An optical fiber preform which can be drawn into a low attenuation optical fiber is provided with a core portion and a cladding portion surrounding the core portion. The core portion includes a first core portion and a second core portion surrounding the first core portion. The cladding portion includes a first cladding portion surrounding the second core portion and a second cladding portion surrounding the first cladding portion. The first core portion contains an alkali metal element, the concentration of oxygen molecules contained in glass is 30 mol ppb or more and 200 mol ppb or less in a part of or entire region having an alkali metal atom concentration of 100 atomic ppm or more, and the concentration of oxygen molecules contained in glass is 10 mol ppb or less in a region having an alkali metal atom concentration of 50 atomic ppm or less.

9 Claims, 6 Drawing Sheets

(52) U.S. Cl.
CPC ......... *C03B37/01869* (2013.01); *C03C 13/045* (2013.01); *G02B 6/02395* (2013.01); *C03B 2201/20* (2013.01); *C03B 2201/50* (2013.01); *C03B 2203/22* (2013.01); *C03B 2203/23* (2013.01); *C03C 2201/11* (2013.01); *C03C 2201/50* (2013.01)

(56) References Cited

U.S. PATENT DOCUMENTS

| | | | |
|---|---|---|---|
| 7,844,155 B2 * | 11/2010 | Bickham | G02B 6/02333 385/126 |
| 8,798,412 B2 * | 8/2014 | Bookbinder | C03B 37/01211 385/126 |
| 9,335,465 B2 * | 5/2016 | Hirano | G02B 6/02042 |
| 2006/0130530 A1 | 6/2006 | Anderson et al. | |

FOREIGN PATENT DOCUMENTS

| | | |
|---|---|---|
| JP | 2008-536190 A | 9/2008 |
| JP | 2009-541796 A | 11/2009 |
| JP | 2010-501894 A | 1/2010 |
| JP | 2010-526749 A | 8/2010 |
| JP | 2012-162443 A | 8/2012 |
| WO | WO-98/02389 A1 | 1/1998 |

* cited by examiner

OPTICAL-FIBER PREFORM AND METHOD FOR MANUFACTURING OPTICAL-FIBER PREFORM

TECHNICAL FIELD

The present invention relates to an optical fiber preform and a method for manufacturing an optical fiber preform.

BACKGROUND ART

JP 2005-537210A (PTL 1), US 2006/0130530A (PTL 2), JP 2007-504080A, JP2008-536190A, JP 2010-501894A, JP 2009-541796A, JP 2010-526749A, WO 98/002389, and U.S. Pat. No. 5,146,534B describe silica base optical fibers in which cores are doped with alkali metal elements. It is said that in the case where a core portion of an optical fiber perform is doped with an alkali metal element, the viscosity of the core portion can be reduced during drawing of the optical fiber preform, relaxation of a network structure of a silica glass proceeds and, thereby, the attenuation of the optical fiber can be decreased.

PTL 1 and PTL 2 describe a diffusion method as a method for doping the silica glass with the alkali metal element. The diffusion method dopes the inside surface of the silica glass pipe with the alkali metal element through diffusion by heating a pipe with an external heat source or generating plasma in the pipe while a source material vapor obtained by heating an alkali metal or an alkali metal salt, which serves as a source material, is introduced into the silica glass pipe.

After the vicinity of the inside surface of the silica glass pipe is doped with the alkali metal element, as described above, the diameter of the resulting silica glass pipe is reduced by heating. After the reduction in diameter, some thickness of the inside surface of the silica glass pipe is etched for the purpose of removing transition metal elements, e.g., Ni and Fe, which are added at the same time with addition of the alkali metal element. The alkali metal element diffuses faster than the transition metal element. Therefore, even when some thickness of glass surface is etched to remove the transition metal element, it is possible to allow the alkali metal element to remain.

After the etching, the glass pipe is heated and collapsed, so that an alkali metal element-doped rod (core portion of an optical fiber preform) is produced. A glass serving as a cladding portion having a refractive index smaller than the refractive index of the core portion is applied around the perimeter of the core portion, so that the optical fiber preform is produced. Then, an optical fiber can be produced by drawing the resulting optical fiber preform by a known method.

SUMMARY OF INVENTION

Technical Problem

It is an object of the present invention to provide an optical fiber preform which can be drawn into a low attenuation optical fiber and a method which can produce such an optical fiber preform.

Solution to Problem

An optical fiber preform is provided. The optical fiber preform includes a core portion and a cladding portion, the core portion contains an alkali metal element, the concentration of oxygen molecules contained in glass is 30 mol ppb or more and 200 mol ppb or less in a part of or entire region having an alkali metal atom concentration of 100 atomic ppm or more, and the concentration of oxygen molecules contained in glass is 10 mol ppb or less in a region having an alkali metal atom concentration of 50 atomic ppm or less.

In the optical fiber perform according to the present invention, preferably, the maximum value of the alkali metal atom concentration is 500 atomic ppm or more and the concentration of oxygen molecules contained in glass is 30 mol ppb or more and 200 mol ppb or less in the a part of or entire region an alkali metal atom concentration of 500 atomic ppm or more. Preferably, the core portion is formed form Ge-free glass and the relative refractive index difference with reference to pure silica glass is within the range of −0.1% or more and +1.0% or less.

In the optical fiber preform according to the present invention, the alkali metal atom concentration is preferably 4,000 atomic ppm or less. The Cl concentration in the core portion is preferably 500 atomic ppm or less. Preferably, the core portion includes a first core portion doped with an alkali metal element and a second core portion which is disposed around the perimeter of the first core portion and which has a Cl concentration of 10,000 atomic ppm or more. Also, the average potassium (K) concentration in the entire core portion is preferably 5 to 100 atomic ppm, and most preferably 10 to 30 atomic ppm.

As another aspect of the present invention, a method for manufacturing the optical fiber preform according to the present invention is provided. The method for manufacturing an optical fiber preform including a core portion and a cladding portion includes the steps of forming a solid core portion by heating a silica glass pipe containing an average concentration of 5 atomic ppm or more of alkali metal atom to a temperature of 1,600° C. or higher with an external heat source to induce collapsing, while an oxygen partial pressure in the inside of the silica glass pipe is maintained at 1 kPa or more and 80 kPa or less and applying a cladding portion having a refractive index smaller than the refractive index of the core portion around the core portion.

Preferably, the collapsing is induced while the internal pressure of the silica glass pipe is maintained at 10 kPa or more and 80 kPa or less. Meanwhile, it is preferable that the collapsing be induced while a gas, in which all inert gas is mixed with oxygen at a flow rate 0.25 or more times and 100 or less times the flow rate of oxygen, is fed into the silica glass pipe.

Advantageous Effects of Invention

The optical fiber preform according to the present invention can be drawn into a low attenuation optical fiber. Also, the method for manufacturing an optical fiber preform, according to the present invention, can produce such an optical fiber preform.

DESCRIPTION OF EMBODIMENTS

Embodiments of the present invention will be described below in detail with reference to attached drawings. The present inventor conducted research on an optical fiber manufacturing method by using a diffusion method and found, in the process thereof, that the attenuation of an optical fiber produced by the method was not always reduced. Then, the present inventor investigated the cause of hindrance to reduction in attenuation of the optical fiber and has completed the present invention.

Figure 1:
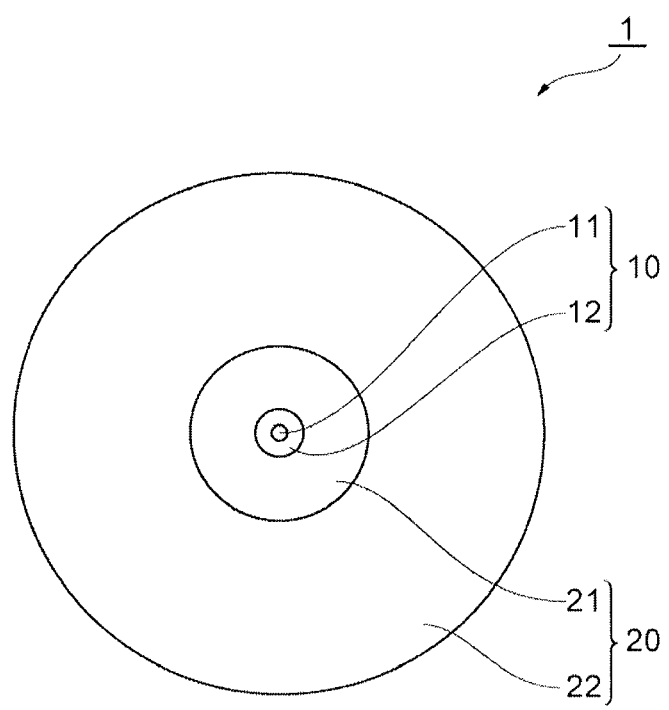
FIG. 1 is a sectional view of an optical fiber preform according to an embodiment of the present invention.

FIG. 1 is a sectional view of an optical fiber preform 1 according to an embodiment of the present invention. The optical fiber preform 1 is formed from silica glass and is provided with a core portion 10 and a cladding portion 20 surrounding the core portion 10. The refractive index of the core portion 10 is higher than the refractive index of the cladding portion 20. The core portion 10 includes a first core portion 11 and a second core portion 12 surrounding the first core portion 11. The cladding portion 20 includes the first cladding portion (optical cladding portion) 21 surrounding the second core portion 12 and a second cladding portion (physical cladding portion) 22 surrounding the first cladding portion 21. The first core portion 11 contains an alkali metal element. This alkali metal element is preferably a potassium element.

Figure 2:
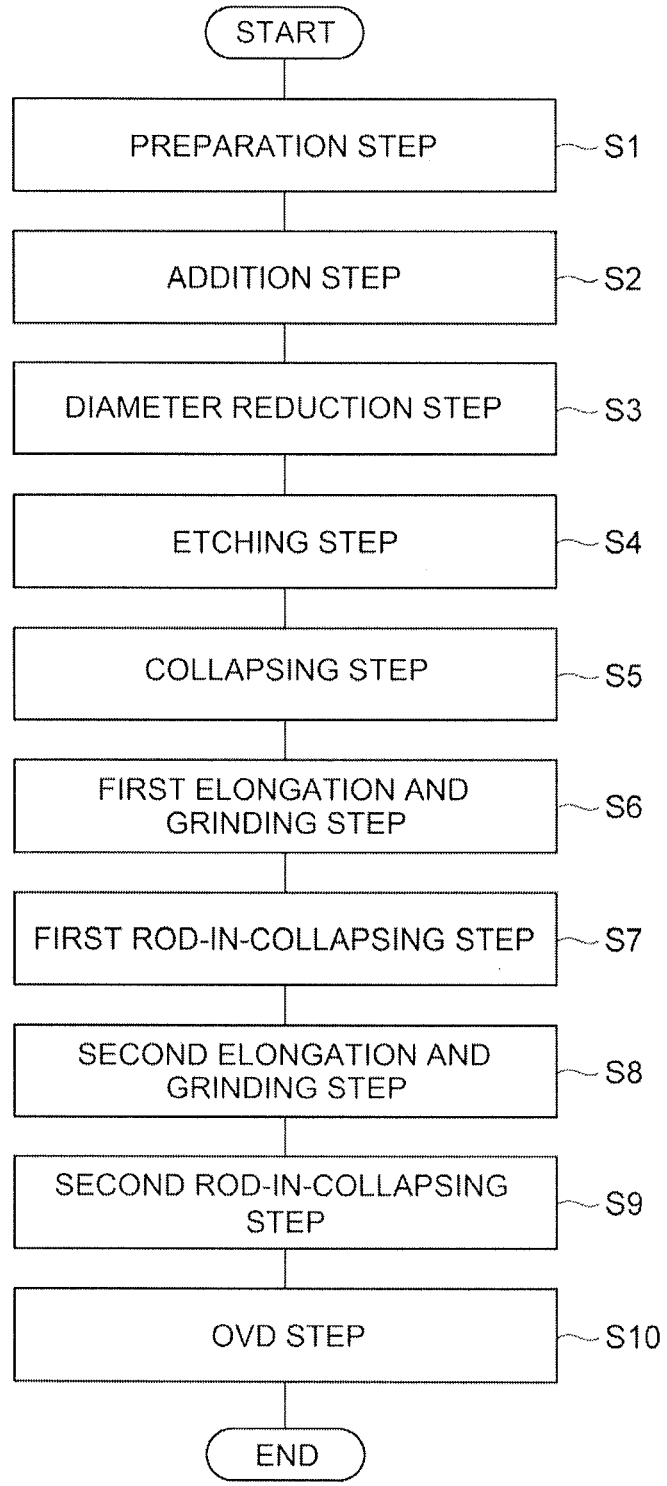
FIG. 2 is a flow chart illustrating a method for manufacturing an optical fiber preform, according to an embodiment of the present invention.

FIG. 2 is a flow chart illustrating a method for manufacturing an optical fiber preform, according to an embodiment of the present invention. In the method for manufacturing an optical fiber preform according to the present embodiment, optical fiber preform 1 is produced by sequentially performing a preparation step (Step S1), an addition step (Step S2), a diameter reduction step (Step S3), an etching step (Step S4), a collapsing step (Step S5), a first elongation and grinding step (Step S6), a first rod-in-collapsing step (Step S7), a second elongation and grinding step (Step S8), a second rod-in-collapsing step (Step S9), and an OVD step (Step S10). In this regard, an example of production condition will be described below.

In the preparation step (Step S1), a silica glass pipe, in which an alkali metal element is to be diffused, is prepared. This silica glass pipe contains 100 atomic ppm of chlorine (Cl) and 6,000 atomic ppm of fluorine, and the concentration of other dopants and impurities is 10 mol ppm or less. The outside diameter of this silica glass pipe is 35 mm in diameter and the inside diameter is about 20 mm in diameter.

In the addition step (Step S2), potassium serving as an alkali metal element is added to the inside surface of the silica glass pipe. Potassium bromide (KBr) is used as a source material. A KBr vapor is generated by heating KBr to a temperature of 840° C. with an external heat source. A silica glass pipe is heated from the outside by an oxyhydrogen burner in such a way that the temperature of the outside surface of the silica glass pipe becomes 2,150° C. while the KBr vapor is introduced into the silica glass pipe with a carrier gas composed of 1 SLM (1 liter/min on a standard state basis) of oxygen. At this time, the burner is traversed at a speed of 40 mm/min, and heating is performed 15 turns in total, so that a potassium metal element is added to the inside surface of the silica glass pipe by diffusion. The maximum value of the potassium concentration in this alkali metal-doped pipe is 1,000 atomic ppm.

In the diameter reduction step (Step S3), the diameter of the silica glass pipe doped with potassium is reduced. At this time, the silica glass pipe is heated with an external heat source in such a way that the outside surface of the silica glass pipe becomes at 2,250° C. while 0.5 SLM of oxygen is passed in the inside of the silica glass pipe. The external heat source is traversed and heating is performed 6 turns in total, so that the diameter of the glass pipe doped with potassium is reduced until the inside diameter reaches 5 mm.

In the etching step (Step S4), the inside surface of the silica glass pipe is etched. At this time, vapor phase etching is performed by heating the silica glass pipe with an external heat source while a mixed gas of $SF_6$ (0.2 SLM) and chlorine (0.5 SLM) is introduced into the inside of the silica glass pipe. Consequently, the pipe inside surface containing a high concentration of impurities added together with the alkali metal element can be removed and these impurities can be removed.

Figure 3:
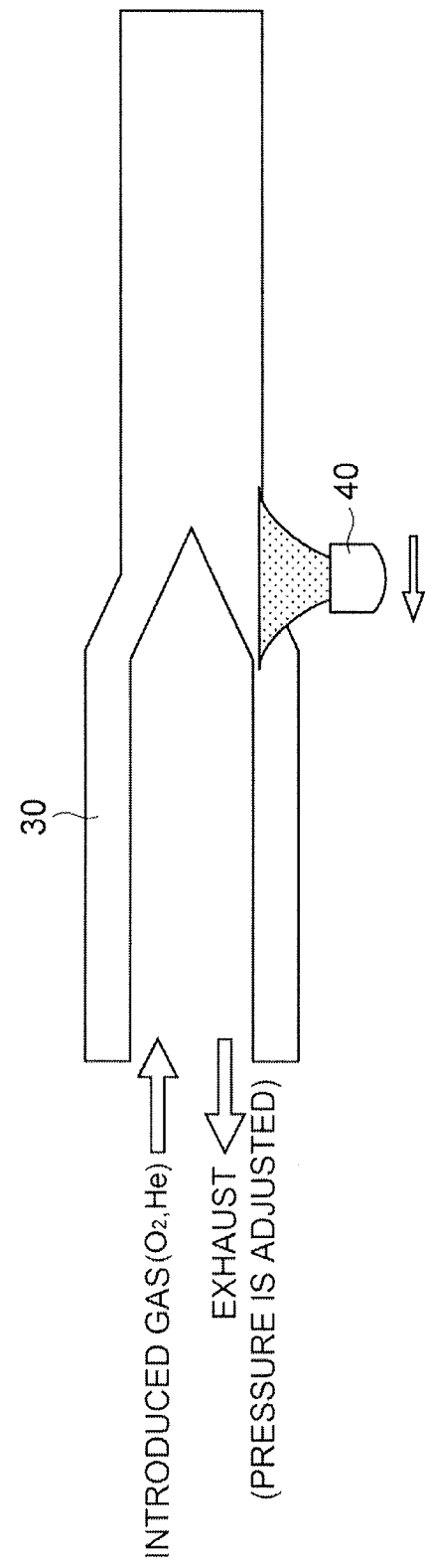
FIG. 3 is a conceptual diagram illustrating a collapsing step in the method for manufacturing an optical fiber preform, shown in FIG. 2.

In the collapsing step (Step S5), the silica glass pipe is collapsed. FIG. 3 is a conceptual diagram illustrating the collapsing step (Step 5) in the method for manufacturing an optical fiber preform according to the present embodiment. In the collapsing step, the oxygen partial pressure is specified to be 8 kPa by decreasing the absolute pressure in the silica glass pipe to 97 kPa or less while a mixed gas of oxygen (0.1 SLM) and He (1 SLM) is introduced into the inside of the silica glass pipe 30. In this state, the silica glass pipe 30 is collapsed by performing heating with an external heat source 40 in such a way that the surface temperature of the silica glass pipe becomes 2,150° C.

A first rod (outside diameter 25 mm) containing the alkali metal element is obtained by this collapsing. The value of the potassium atom concentration in the first rod is 600 atomic ppm at a maximum and is 550 atomic ppm on a center axis. The diameter of the region doped with 50 atomic ppm or more of potassium is 8 mm. The dissolved oxygen molecule concentration in the first rod can be measured on the basis of the intensity of fluorescence at a wavelength of 1,272 nm when the light with a wavelength of 765 nm is applied (refer to, for example, K. Kajihara, et al., J. Ceramic Soc. Japan 112 [10], pp. 559-562 (2004)). The dissolved oxygen molecule concentration is at a maximum in the vicinity of the central axis portion of the first rod and the value thereof is, for example, 52 mol ppb.

In the elongation and grinding step (Step S6), the first rod obtained by collapsing is elongated in such a way that the diameter becomes 20 mm and, thereafter, the perimeter portion is ground in such a way that the diameter becomes 13 mm to produce a first core portion 11.

In the rod-in-collapsing step (Step S7), a second core portion 12 is disposed around the first core portion 11 and, thereby, a second rod is obtained. At this time, the second rod is formed by the rod-in-collapse method, where the first core portion 11 is inserted into the inside of the silica glass pipe (second core portion 12) which is doped with 5,000 atomic ppm of Cl atom and which has an outside diameter of 65 mm and both of the first and second core portions are heated and integrated with an external heat source.

In the second elongation and grinding step (Step S8), the second rod is elongated in such a way that the diameter becomes 24 mm and, thereafter, the perimeter portion is ground in such a way that the diameter becomes 20 mm. As a result, the ratio D2/D1 of the diameter D2 of the second core portion to the diameter D1 of the first core portion becomes 3. The first core portion 11 and the second core portion 12 are merged into the core portion 10.

In the second rod-in-collapsing step (Step S9), a first cladding portion 21 is disposed around the core portion 10. At this time, a rod-in-collapse method is used, where the core portion 10 is inserted into the inside of the silica glass pipe (first cladding portion 21) doped with fluorine and both of the core portion 10 and first cladding portion 21 are heated and integrated with an external heat source. The maximum relative refractive index difference between the second core portion 12 and the first cladding portion 21 is about 0.34%. As a result of synthesis by this rod-in-collapse method, the amount of water in the core portion 10 and the first cladding portion 21 in the vicinity thereof can be decreased to a sufficiently low level.

In the OVD step (Step S10), the rod produced by integrating the core portion 10 and the first cladding portion 21 is elongated to a predetermined diameter, and thereafter, a second cladding portion 22 containing fluorine is synthesized by the OVD method around the rod to produce an optical fiber preform 1. In the resulting optical fiber preform 1, the outside diameter of the first cladding portion 21 is 36 mm and the outside diameter of the second cladding portion 22 is 140 mm. The maximum relative refractive index difference between the second core portion 12 and the second cladding portion 22 is about 0.32% at a maximum. Meanwhile, the OH group concentration outside the first cladding portion 21 can be measured by using infrared absorption spectroscopy and is about 400 mol ppm.

In the following drawing step, an optical fiber can be obtained by drawing the optical fiber preform 1 produced by the above-described method for manufacturing an optical fiber preform. The drawing speed is 2,300 m/min, and the drawing tension is 0.5 N.

The optical fiber preform 1 was produced under conditions described above and the optical fiber was further produced. Characteristics of the resulting optical fiber are as shown in Table below and, therefore, the optical fiber exhibiting low attenuation was obtained.

TABLE

| Item | Unit | Characteristic value |
|---|---|---|
| Potassium concentration | average value in core | atomic ppm | about 3 |
| Attenuation | @ 1300 nm | dB/km | 0.287 |
| | @ 1380 nm | dB/km | 0.292 |
| | @ 1550 nm | dB/km | 0.162 |
| Chromatic dispersion | @ 1550 nm | ps/nm/km | +15.9 |
| Dispersion slope | @ 1550 nm | ps/nm$^2$/km | +0.054 |
| Zero dispersion wavelength | | nm | 1310 |
| Dispersion slope | @ zero dispersion wavelength | ps/nm$^2$/km | +0.083 |
| Effective area | @ 1550 nm | μm$^2$ | 82 |
| Mode field diameter | @ 1550 nm | μm | 10.3 |
| | @ 1310 nm | μm | 9.1 |
| Fiber cutoff wavelength | on 2 m length of fiber | nm | 1310 |
| Cable cutoff wavelength | on 22 m length of fiber | nm | 1230 |
| Polarization mode dispersion | C band, L band | ps/√km | 0.11 |
| Nonlinear coefficient | @ 1550 nm, random polarization state | (W · km)$^{-1}$ | 1.1 |

In an modified example, a core portion containing an alkali metal element was produced under the same condition except that in the addition step (Step S2), the temperature of KBr was specified to be 800° C. and, therefore, the addition step was performed while the concentration of the KBr vapor was reduced. The value of the potassium atom concentration in this core portion was 200 atomic ppm at a maximum and was 150 atomic ppm on a center axis. The diameter of the region doped with 10 atomic ppm or more of potassium was 6 mm. The dissolved oxygen molecule concentration in the core portion was at a maximum in the vicinity of the central axis portion of the first rod and the value thereof was, for example, 180 mol ppb. An optical fiber was produced by drawing the resulting optical fiber preform. As a result, the attenuation of the optical fiber at a wavelength of 1,550 nm was 0.165 dB/km.

In a comparative example, an optical fiber preform was produced, where the condition of the collapsing step (Step S5) was changed. In the collapsing step, the absolute pressure in the silica glass pipe was decreased to 97 kPa or less and 80 kPa or more while oxygen (1 SLM) was introduced into the inside of the silica glass pipe, and the silica glass pipe was collapsed while the surface temperature was specified to be 2,150° C. with an external heat source. A core portion (outside diameter 25 mm) containing an alkali metal element was produced by this collapsing. The value of the potassium atom concentration in this core portion was 500 atomic ppm at a maximum. The diameter of the region doped with 10 atomic ppm or more of potassium was 6 mm. The dissolved oxygen molecule concentration in the core portion was at a maximum in the vicinity of the center axis of the first rod and the value thereof was 234 mol ppb. An optical fiber was produced by drawing the optical fiber preform according to the comparative example. As a result, the attenuation of the optical fiber at a wavelength of 1,550 nm was 0.185 dB/km.

As is clear from the description above, the magnitude of attenuation of the optical fiber is changed depending on the condition (and the composition distribution of the optical fiber preform based on this condition) of the collapsing step (Step S5) in the method for manufacturing an optical fiber preform. The present inventor conducted intensive research on the relationship between the condition of the collapsing step, the composition distribution of the optical fiber preform, and the attenuation of the optical fiber and determined the condition of the collapsing step and the composition distribution of the optical fiber preform to obtain a low attenuation optical fiber.

In the first core portion 11 of the optical fiber preform 1 according to the present embodiment, the concentration of oxygen molecules contained in glass is 30 mol ppb or more and 200 mol ppb or less in a part of or entire region having an alkali metal atom concentration of 100 atomic ppm or more, and the concentration of oxygen molecules contained in glass is 10 mol ppb or less in a region having an alkali metal atom concentration of 50 atomic ppm or less. In this regard, preferably, the core portion 10 is formed from Ge-free glass and the relative refractive index difference with reference to pure silica glass is within the range of −0.1% or more and +1.0% or less. Consequently, a scattering loss due to Ge and the like can be reduced, so that the attenuation at a wavelength of 1,550 nm can be reduced to 0.158 dB/km.

In the optical fiber preform 1 according to the present embodiment, the alkali metal atom concentration is preferably 4,000 atomic ppm or less. In the case where the alkali metal atom concentration is over 4,000 atomic ppm, the alkali metal atom consumes the oxygen atom in the glass and, thereby, the glass is brought into an oxygen-deficient state, so that an oxygen deficient type glass defect is generated. The attenuation is increased by the absorption loss derived from this glass defect, so that low attenuation cannot be achieved. Therefore, the alkali metal atom concentration is preferably 4,000 atomic ppm or less.

In the optical fiber preform 1 according to the present embodiment, the Cl concentration in the core portion 10 is preferably 500 atomic ppm or less. In the case where the Cl concentration is over 500 atomic ppm, oxidizing components, e.g., oxygen and chlorine, increase in the glass and an oxygen excess type glass defect is generated easily. The attenuation is increased by the absorption loss derived from this glass defect, so that low attenuation cannot be achieved. Therefore, the Cl concentration in the core portion 10 is preferably 500 atomic ppm or less.

In the optical fiber preform 1 according to the present embodiment, preferably, the core portion 10 includes the first core portion 11 doped with the alkali metal element and the second core portion 12 which is disposed around the perimeter of the first core portion 11 and which has a Cl concentration of 10,000 atomic ppm or more. The alkali metal element has a high diffusion rate and, therefore, diffuses to the outside of the fiber core during the drawing step. At this time, the peripheral portion not doped with oxygen is brought into an oxygen-deficient state easily because of diffusion of the alkali metal element, and it is estimated that an increase in the loss occurs thereby. Consequently, it is preferable that generation of oxygen deficient type defect due to diffusion of the alkali metal element be suppressed by adding a high concentration of Cl to the glass, into which the alkali metal element diffuses.

In the optical fiber preform 1 according to the present embodiment, the average K concentration in the entire core portion 10 is preferably 5 to 100 atomic ppm, and most preferably 10 to 30 atomic ppm. The alkali metal element in the core portion 10 is bonded to chlorine to generate an alkali chloride. It is estimated that the resulting alkali chloride coagulates in the glass and causes a scattering loss. In the case where a core in which the average concentration of alkali metal element in the entire core portion 10 was more than 30 atomic ppm was produced actually, an increase in the loss occurred and this increase in the loss was considerable in the case where 100 atomic ppm was exceeded. Therefore, the average K concentration in the entire core portion 10 is preferably 5 to 100 atomic ppm, and most preferably 10 to 30 atomic ppm.

The method for manufacturing an optical fiber preform, according to the present invention, is a method for manufacturing the optical fiber preform according to the present invention, where the solid core portion 10 including the first core portion 11 is formed by heating a silica glass pipe containing an average concentration of 5 atomic ppm or more of alkali metal atom to a temperature of 1,600° C. or higher with an external heat source to induce collapsing, while the oxygen partial pressure in the inside of the silica glass pipe is maintained at 1 kPa or more and 80 kPa or less, and applying the cladding portion 20 around the core portion 10 to produce the optical fiber preform 1 including the core portion 10 and the cladding portion 20. It is preferable that the collapsing be induced while the internal pressure of the silica glass pipe is maintained at 10 kPa or more and 80 kPa or less. Also, it is preferable that the collapsing be induced while a gas, in which an inert gas is mixed with oxygen at a flow rate 0.25 or more times and 100 or less times the flow rate of oxygen, is fed into the silica glass pipe.

Figure 4:
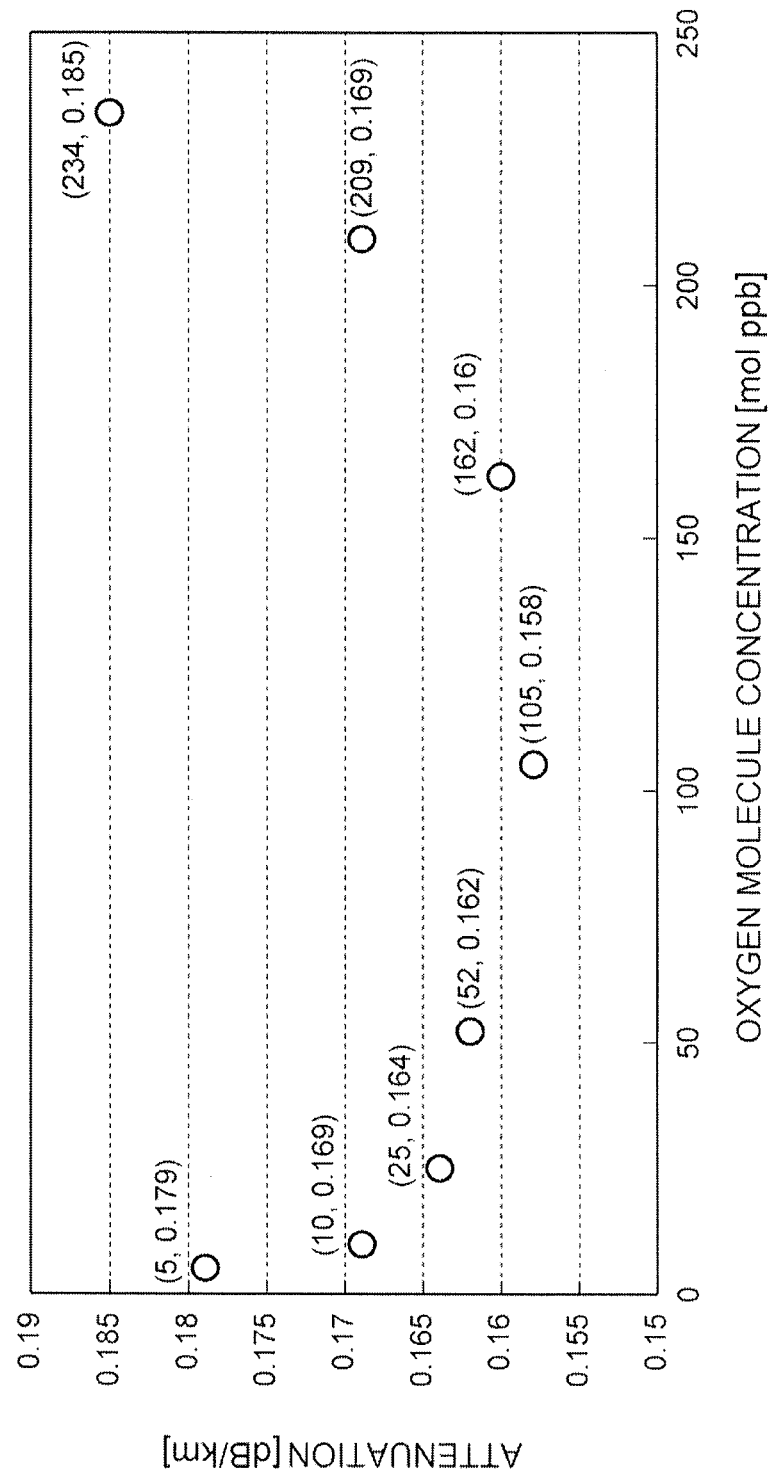
FIG. 4 is a graph showing the relationship between the oxygen molecule concentration in the central portion of the core portion of an optical fiber preform and the attenuation of an optical fiber at a wavelength of 1,550 nm.

FIG. 4 is a graph showing the relationship between the maximum oxygen molecule concentration in the central portion of the core portion of an optical fiber preform and the attenuation of an optical fiber at a wavelength of 1,550 nm. The alkali metal atom concentration in the central portion of the core portion of the optical fiber preform was 500 atomic ppm at a maximum. If the oxygen molecule concentration is smaller than 30 mol ppb, the attenuation increases sharply. The reason for this is considered that the glass is brought into an oxygen-deficient state and, thereby, an oxygen deficient type defect is generated. Meanwhile, the attenuation increases when the oxygen molecule concentration is 200 mol ppb or more. The reason for this is considered that a glass defect was generated because oxygen was excessive.

Figure 5:
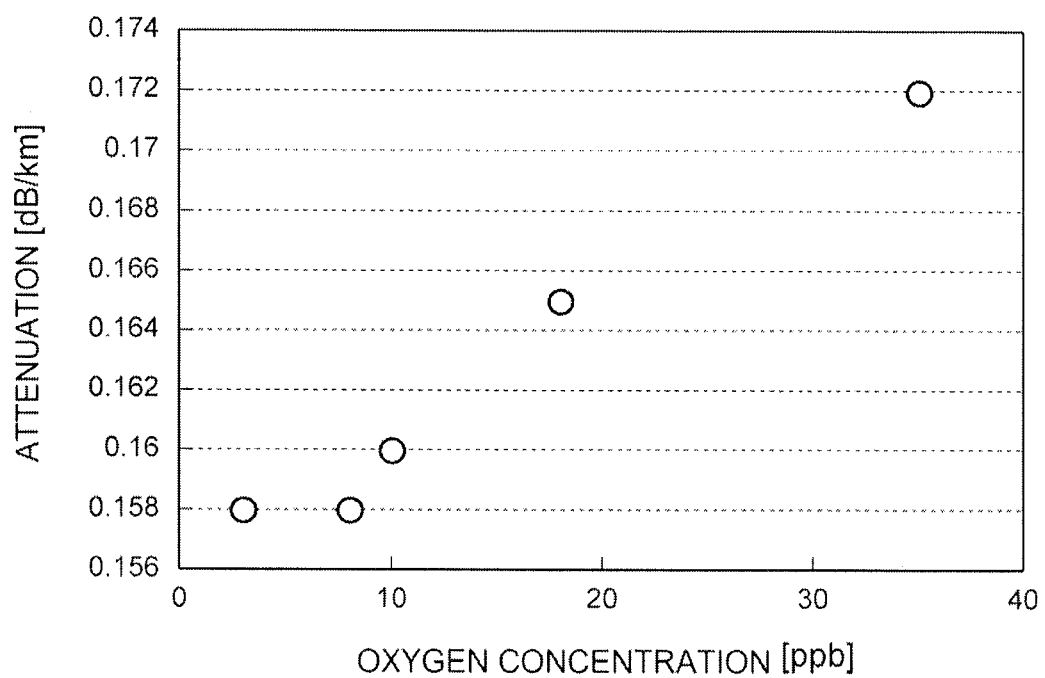
FIG. 5 is a graph showing the relationship between the oxygen molecule concentration at the position 4 mm distant from the center of an optical fiber preform and the attenuation of an optical fiber at a wavelength of 1,550 nm.

FIG. 5 is a graph showing the relationship between the oxygen molecule concentration at the position 4 mm distant from the center of an optical fiber preform and the attenuation of an optical fiber at a wavelength of 1,550 nm. The oxygen molecule concentration in the central portion of the core portion of the optical fiber preform was 200 mol ppb, and the alkali metal element concentration at the position 4 mm distant from the center was 50 atomic ppm. When the oxygen molecule concentration is 10 mol ppb or more in the region having an alkali metal atom concentration of 50 atomic ppm or less, the attenuation increases sharply. The reason for this is considered that in the region in which the alkali metal atoms are present, oxygen molecules are consumed by the reaction of the oxygen molecule with the alkali metal atom, whereas in the region in which the alkali metal atom concentration is low, oxygen is not consumed and becomes excessive and, thereby, an oxygen excess glass defect is generated easily.

Figure 6:
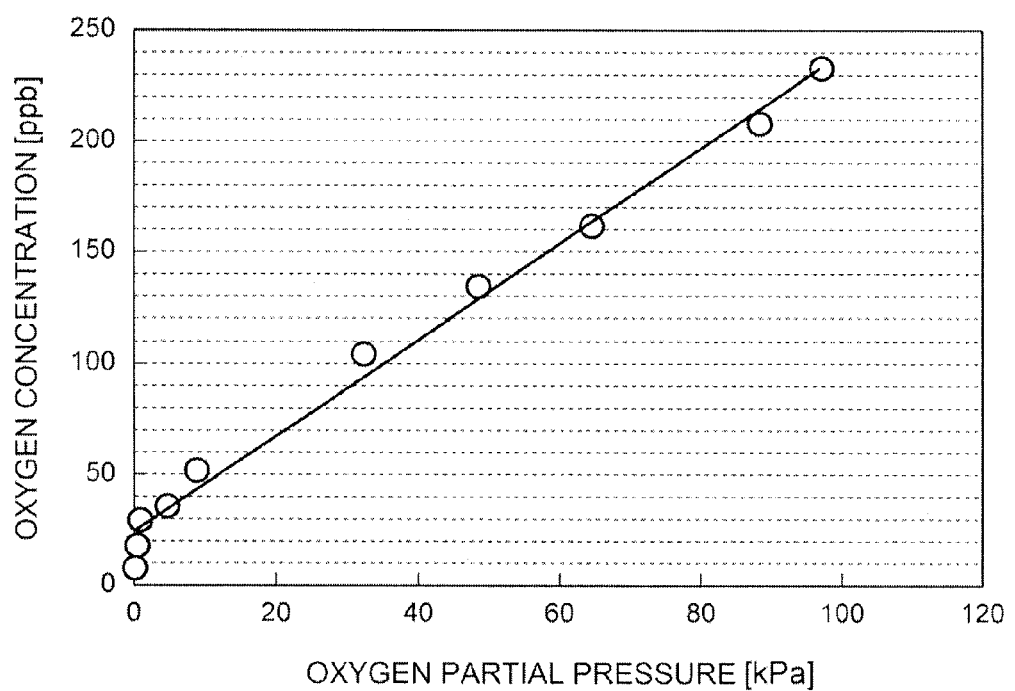
FIG. 6 is a graph showing the relationship between the oxygen partial pressure during the collapsing step and the oxygen molecule concentration in the central portion of a core rod after collapsing.

FIG. 6 is a graph showing the relationship between the oxygen partial pressure during the collapsing step and the oxygen molecule concentration in the central portion of a core rod after collapsing. A core rod obtained by performing the collapsing step under the condition in which the oxygen partial pressure was 1 kPa or more and 80 kPa or less exhibited the above-described oxygen molecule concentration at which a low attenuation was obtained.

In the collapsing step, the oxygen partial pressure in the silica glass pipe can be specified to be a predetermined value by specifying the internal pressure of the silica glass pipe to be 10 kPa or more and 80 kPa or less. In this regard, in the case where the internal pressure of the silica glass pipe is specified to be less than 10 kPa, a pressure difference between the inside and the outside of the silica glass pipe increases, so that deformation and crush of the silica glass pipe are caused or reduction in the yield is caused on the basis of an occurrence of crystallization on the inside surface of the silica glass pipe due to an occurrence of crush at a low temperature.

In the collapsing step, the oxygen partial pressure in the silica glass pipe can be specified to be a predetermined value by feeding a gas, in which an inert gas is mixed with oxygen at a flow rate 0.25 or more times and 100 or less times the flow rate of oxygen, into the silica glass pipe. At this time, $N_2$, Ar, He, or the like is used as the inert gas and, in particular, He is preferably used. In this regard, if a gas (in particular, active gas) other than He is used, the gas remains in the glass after collapsing, generates bubbles and split phases, causes changes in outside diameter and break of an optical fiber in a downstream step, and brings about occurrences of defects.

INDUSTRIAL APPLICABILITY

A low attenuation optical fiber suitable for digital coherent communications can be produced.

The invention claimed is:

1. An optical fiber preform comprising a core portion and a cladding portion,
   wherein the core portion contains an alkali metal element, the concentration of oxygen molecules contained in glass is 30 mol ppb or more and 200 mol ppb or less in a part of or entire region having an alkali metal atom concentration of 100 atomic ppm or more, and the concentration of oxygen molecules contained in glass is 10 mol ppb or less in a region having an alkali metal atom concentration of 50 atomic ppm or less.

2. The optical fiber preform according to claim 1,
   wherein the core portion is made from Ge-free glass, and the relative refractive index difference with reference to pure silica glass is within the range of −0.1% or more and +1.0% or less.

3. The optical fiber preform according to claim 1,
   wherein the alkali metal atom concentration is 4,000 atomic ppm or less.

4. The optical fiber preform according to claim 1,
   wherein the Cl concentration in the core portion is 500 atomic ppm or less.

5. The optical fiber preform according to claim 1,
   wherein the core portion includes a first core portion doped with an alkali metal element and a second core portion which is disposed around the perimeter of the first core portion and which has a Cl concentration of 10,000 atomic ppm or more.

6. The optical fiber preform according to claim 1,
   wherein the average K concentration in the entire core portion is 5 to 100 atomic ppm.

7. A method for manufacturing the optical fiber preform according to claim 1, comprising the steps of:
   forming a solid core portion by heating a silica glass pipe containing an average concentration of 5 atomic ppm or more of alkali metal atom to a temperature of 1,600° C. or higher with an external heat source to induce collapsing, while an oxygen partial pressure in the inside of the silica glass pipe is maintained at 1 kPa or more and 80 kPa or less; and
   applying a cladding portion around the core portion,
   wherein the resulting optical fiber preform includes the core portion and the cladding portion having a refractive index smaller than the refractive index of the core portion.

8. The method for manufacturing the optical fiber preform, according to claim 7,
   wherein the collapsing is induced while the internal pressure of the silica glass pipe is maintained at 10 kPa or more and 80 kPa or less.

9. The method for manufacturing the optical fiber preform, according to claim 7,
   wherein the collapsing is induced while a gas, in which an inert gas is mixed with oxygen at a flow rate 0.25 or more times and 100 or less times the flow rate of oxygen, is fed into the silica glass pipe.

* * * * *